United States Patent Office 3,751,446
Patented Aug. 7, 1973

3,751,446
PREPARATION OF ARYL-SUBSTITUTED
ACETYLENIC COMPOUNDS
Richard F. Heck, Wilmington, Del., assignor to Hercules Incorporated, Wilmington, Del.
No Drawing. Filed Mar. 16, 1971, Ser. No. 124,920
The portion of the term of the patent subsequent to Sept. 8, 1987, has been disclaimed
Int. Cl. C07c 69/76, 15/02, 3/54
U.S. Cl. 260—469                                      10 Claims

ABSTRACT OF THE DISCLOSURE

Aryl-substituted acetylenic compounds are prepared by reacting acetylene or an arylacetylene such as phenylacetylene with an organopalladium compound. The latter compound is prepared by reacting a palladium salt such as palladium acetate with a suitable organomercury, tin or lead compound as, for example, diphenylmercury, tetraphenyltin, tetraphenyllead, phenylmercuric acetate.

---

This invention relates to a process of preparing aryl-substituted acetylenic compounds.

Many acetylenic compounds are readily prepared by known methods such as the dehydrohalogenation of gem or vicinyl dihalides with strong bases under vigorous conditions or by the alkylation or carboxylation of acetylenic anions under basic conditions. These reactions are limited to the production of acetylenic compounds that do not have base sensitive groups. In addition, in the first reaction, the necessary dihalides are often difficult to obtain and during the dehydrohalogenation reaction, allenes or rearranged acetylenes, are often produced instead of the desired acetylenic compound. In the second of the above methods of preparation, the alkylations succeed only with unhindered and reactive alkylating agents.

Now in accordance with this invention, a process of preparing aryl-substituted acetylenes has been discovered which avoids the above-mentioned complications. In the process of this invention, acetylene or a mono-aryl-substituted acetylene is reacted with an organopalladium compound formed by reacting an organo-mercury, -tin or -lead compound with a palladium alkanoate. The reaction that takes place is believed to take place by the following steps, using the acetate salts for illustrative purposes:

R'HgOAc + Pd(OAc)₂ ⟶ [R'PdOAc] + Hg(OAc)₂

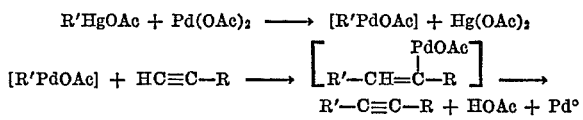

R'—C≡C—R + HOAc + Pd°

Acetylenic compounds to which this reaction can be applied have the formula R—C≡C—H where R is H or aryl including substituted aryls, as for example phenyl, tolyl, xylyl, p-isopropylphenyl, naphthyl, biphenylyl, p-chlorophenyl, p-methoxyphenyl, p-carbomethoxyphenyl, nitronaphthyl, etc.

The organopalladium compound that is reacted with the acetylenic compound can be preformed or formed in situ. Any palladium salt of a carboxylic acid can be used in preparing the organopalladium compounds as, for example, palladium alkanoates such as palladium acetate, palladium propionate, palladium butyrate, or salts of aromatic carboxylic acids such as palladium benzoate, palladium phthalate, etc.

The organo-mercury, -tin, or -lead compound has the formula R'$_n$MY$_{x-n}$ where M is mercury, tin or lead and when M is mercury, x is 2 and n is 1 or 2 and when M is tin or lead, x is 4 and n is 1, 2 or 3, R' is an alkyl radical of 1 to 12 carbon atoms, aryl, aralkyl, alkaryl, or a substituted aryl wherein the substituents are alkoxy, halo, nitro, hydroxy, aldehydo, carboxy or carboalkoxy, said alkoxy groups containing from 1 to 6 carbon atoms, said alkyl and aralkyl groups containing no hydrogen attached to the carbon beta to M, and Y is R' or a carboxylic acid anion. Additionally, when M is mercury R' can be carboalkoxy where the alkoxy group contains 1 to 6 carbon atoms. Exemplary of these compounds are phenylmercuric acetate, phenylmercuric propionate, phenylmercuric benzoate, xylylmercuric acetate, naphthylmercuric acetate, methylmercuric acetate, neopentylmercuric acetate, 2,2-dimethylbutylmercuric acetate, 2,2-diethylbutylmercuric acetate, benzylmercuric acetate, cumylmercuric acetate, mesitylmercuric benzoate, 3-nitrophenylmercuric acetate, 3-carboxyphenylmercuric acetate, p-carbomethoxyphenylmercuric acetate, 4-acetoxymercurisalicyladehyde, 3-nitrophenylmercuric acetate, p-anisylmercuric acetate, diphenylmercury, di-p-tolylmercury, bis(p-chlorophenyl)mercury, dimethylmercury, dineopentylmercury, dibenzylmercury, etc., and the corresponding tin and lead compounds. Carboalkoxymercuric compounds that can be used are carbomethoxymercuric acetate, carboethoxymercuric acetate, carbopropoxymercuric acetate, carbobutoxymercuric acetate, carbohexoxymercuric acetate, etc.

The ratio of the palladium carboxylic acid salt to the organometallic compound will preferably be one mole of palladium compound to each organic group in the organometallic compound. Thus, if the organometallic is tetramethyltin, the ratio will be 4:1 and if the organometallic is phenylmercuric acetate, the ratio will be 1:1. Obviously different ratios can be used, but this will generally leave one reagent partly unreacted at the end of the reaction.

The acetylenic reactant is generally used in excess so that any side reactions will occur with it rather than the product. The ratio of the acetylenic compound to the palladium compound can vary widely but generally will be from about 1:1 to about 20:1 or higher, and preferably will be from about 2:1 to about 10:1.

The preparation of the arylacetylene compound will preferably be carried out in an inert polar diluent as, for example, nitriles such as acetonitrile, propionitrile, benzonitrile, etc., ethers such as the dimethyl ether of diethylene glycol, the dimethyl ether of ethylene glycol, etc., nitrocompounds such as nitrobenzene, chlorinated hydrocarbons such as methylene chloride, etc.

The reaction is generally carried out at low temperature to avoid polymerization of the acetylenic compound. A temperature of from about −25° C. up to 100° C. can be used but preferably a temperature of from about −10° C. to about 50° C. is used. The reaction time required will, of course, depend on the reaction conditions, but preferably will be as short as possible to avoid subsequent reaction of the product in the reaction mixture.

The following examples will illustrate the process of this invention.

EXAMPLE 1

A mixture of 1.68 g. (5 mmoles) phenylmercuric acetate, 10 ml. of acetonitrile and 2 ml. (1.9 g.) of phenylacetylene was stirred at 0° C. in an ice bath and 1.12 g. (5 mmoles) of powdered palladium acetate was added. After stirring for 30 minutes at 0° C. the reaction was continued at room temperature for 15 hours. Analysis by gas chromatography then showed that 3.84 mmoles or 77% of theory based upon the palladium acetate of diphenylacetylene had been produced.

EXAMPLE 2

The process of Example 1 was carried out with 5 mmoles of p-anisylmercuric acetate in place of phenylmercuric acetate. There was obtained 1-p-anisyl-2-phenylacetylene.

EXAMPLE 3

The process of Example 1 was carried out with 5 mmoles of p-carbomethoxyphenylmercuric acetate in place of phenylmercuric acetate and 1-p-carbomethoxyphenyl-2-phenylacetylene was produced.

EXAMPLE 4

A 300 ml. glass vessel containing a magnetic stirring bar charged with 1.68 g. (5 mmoles) of phenylmercuric acetate and 1.15 g. (5 mmoles) of powdered palladium acetate. The vessel was capped with a self-sealing rubber lined cap and then the air was replaced with nitrogen and then with acetylene by alternate evacuation and pressuring. The reaction mixture was stirred in an ice bath under 10 p.s.i.g. of acetylene and 10 ml. of ice cold acetonitrile presaturated with acetylene under 10 p.s.i.g. was injected. After stirring for 30 minutes at 0° C., gas chromotatographic analysis showed that a 4% yield of phenylacetylene had been obtained.

EXAMPLE 5

The process of Example 1 was employed using 1.37 g. (5 mmoles) of methylmercuric acetate instead of phenylmercuric acetate. There was obtained a 26% yield of 1-phenyl-1-propyne.

EXAMPLE 6

The process of Example 1 was used with 1.65 g. (5 mmoles) of neopentylmercuric acetate in place of phenylmercuric acetate. The product so obtained was 1-neopentyl-2-phenylacetylene.

EXAMPLE 7

The process of Example 1 was employed using 0.53 g. (1.25 mmoles) of tetraphenyltin instead of the phenylmercuric acetate used in that example. Diphenylacetylene was produced in good yield.

EXAMPLE 8

The process of Example 1 was employed using 0.64 g. (1.25 mmoles) of tetraphenyllead instead of the phenylmercuric acetate used in that example. A good yield of diphenylacetylene was obtained.

EXAMPLE 9

To a stirred mixture of 0.64 g. (2 mmoles) carbomethoxymercuric acetate, 10 ml. acetonitrile and 1.9 g. (2 ml.) of phenylacetylene at 0° C., was added 0.45 g. (2 mmoles) of palladium acetate. After stirring for 30 minutes at 0° C. and then for 16 hours at room temperature, there was obtained a 41% yield of methyl 3-phenylpropiolate.

EXAMPLE 10

The process of Example 9 was used employing 1.28 g. (4 mmoles) of carbomethoxymercuric acetate instead of only 0.64 g. There was obtained methyl 3-phenylpropiolate in 82% yield.

What I claim and desire to protect by Letters Patent is:

1. The process of preparing aryl-substituted acetylenic compounds which comprises contacting an acetylenic compound having the formula R—C≡C—H where R is H or an aryl radical at a temperature of from about −25° C. to about 100° C. with an organopalladium compound formed by reacting a palladium salt of a carboxylic acid with an organopalladium compound formed by reacting a palladium salt of a carboxylic acid with an organometallic compound selected from (a) a compound having the formula $R'_n MY_{x-n}$ where M is mercury, tin or lead, and when M is mercury, $x$ is 2 and $n$ is 1 or 2, and when M is tin or lead, $x$ is 4 and $n$ is 1, 2 or 3, R' alkyl containing 1 to 12 carbon atoms, aryl, aralkyl, alkaryl or a substituted aryl wherein the substituents are alkoxy, halo, nitro, hydroxy, aldehydo, carboxy or carboalkoxy, said alkoxy groups containing from 1 to 6 carbon atoms, and Y is R' or a carboxylic acid anion, said alkyl and aralkyl containing no hydrogen on the carbon beta to M, or (b) a carboalkoxymercuric alkanoate wherein the alkoxy group contains from 1 to 6 carbon atoms.

2. The process of claim 1 wherein the acetylenic compound having the formula R—C≡C—H is acetylene.

3. The process of claim 1 wherein the acetylenic compound having the formula R—C≡C—H is phenylacetylene.

4. The process of claim 2 wherein the organopalladium compound is formed by reacting palladium acetate with phenylmercuric acetate.

5. The process of claim 3 wherein the organopalladium compound is formed by reacting palladium acetate with phenylmercuric acetate.

6. The process of claim 3 wherein the organopalladium compound is formed by reacting palladium acetate with p-anisylmercuric acetate.

7. The process of claim 3 wherein the organopalladium compound is formed by reacting palladium acetate with methylmercuric acetate.

8. The process of claim 3 wherein the organopalladium compound is formed by reacting palladium acetate with neopentylmercuric acetate.

9. The process of claim 3 wherein the organopalladium compound is formed by reacting palladium acetate with a carboalkoxymercuric acetate.

10. The process of claim 3 wherein the organopalladium compound is formed by reacting palladium acetate with p-carbomethoxyphenylmercuric acetate.

References Cited

UNITED STATES PATENTS

| | | | |
|---|---|---|---|
| 3,574,777 | 4/1971 | Heck | 260—671 |
| 3,527,794 | 9/1970 | Heck | 260—476 |

LORRAINE A. WEINBERGER, Primary Examiner

R. D. KELLY, Assistant Examiner

U.S. Cl. X.R.

260—476 R, 515 R, 599, 612 R, 612 D, 619 R, 621 R, 645, 649 R, 650 R, 668 B, 671 A, 671 C

UNITED STATES PATENT OFFICE
CERTIFICATE OF CORRECTION

PO-1050
(5/69)

Patent No. 3,751,446      Dated August 7, 1973

Inventor(s) Richard F. Heck (Case 32)

It is certified that error appears in the above-identified patent and that said Letters Patent are hereby corrected as shown below:

Column 1, line 26 & 27, "contions" should read --conditions--

Column 2, line 15, "4-acetoxymercurisalicyladehyde" should read --4-acetoxymercurisalicylaldehyde--

Column 3, line 9, insert --was-- after "bar"

Column 4, lines 5 & 6, delete "organopalladium compound formed by reacting a palladium salt of a carboxylic acid with an"

Column 4, (Cl. 1), line 11, insert --is-- after "R' "

Signed and sealed this 20th day of November 1973.

(SEAL)
Attest:

EDWARD M. FLETCHER, JR.
Attesting Officer

RENE D. TEGTMEYER
Acting Commissioner of Patents